United States Patent
Kwong et al.

(10) Patent No.: US 6,815,386 B1
(45) Date of Patent: Nov. 9, 2004

(54) USE OF PHOSPHATES TO REDUCE SLAG PENETRATION IN CR2O3-BASED REFRACTORIES

(76) Inventors: Kyei-Sing Kwong, 1450 Queen Ave., SW., Albany, OR (US) 97321; Cynthia P. Dogan, 1450 Queen Ave., SW., Albany, OR (US) 97321; James P. Bennett, 1450 Queen Ave. SW., Albany, OR (US) 97321; Richard E. Chinn, 1450 Queen Ave. SW., Albany, OR (US) 97321-2198; Arthur V. Petty, 1450 Queen Ave., SW., Albany, OR (US) 97321

( * ) Notice: Subject to any disclaimer, the term of this patent is extended or adjusted under 35 U.S.C. 154(b) by 0 days.

(21) Appl. No.: 10/279,120

(22) Filed: Oct. 23, 2002

(51) Int. Cl.[7] .......................... C04B 35/12; C04B 35/105
(52) U.S. Cl. ...................... 501/126; 501/103; 501/105; 501/127
(58) Field of Search ................................ 501/126, 127, 501/103, 105

(56) References Cited

U.S. PATENT DOCUMENTS

| | | | | |
|---|---|---|---|---|
| 4,039,344 A | * | 8/1977 | Nishikawa et al. | ............ 501/89 |
| 4,125,409 A | * | 11/1978 | Friedrichs et al. | ........... 501/131 |
| 4,235,636 A | * | 11/1980 | Friedrichs et al. | ........... 501/111 |
| 4,507,395 A | * | 3/1985 | Jones | ......................... 501/115 |
| 4,823,359 A | * | 4/1989 | Ault et al. | ................... 373/137 |

* cited by examiner

*Primary Examiner*—Karl Group
(74) *Attorney, Agent, or Firm*—Mark F. LaMarre; Mark P. Dvorscak; Paul A. Gottlieb

(57) ABSTRACT

A high-chromium refractory material that provides improved resistance to coal slag penetration is presented. The refractory mixture comprises a blend of chromium oxide, aluminum oxide and phosphates. The refractory mixture may be blended with an aggregate and cured. In addition a phosphorous oxide may be blended with chromium oxide and aluminum oxide and additionally an aggregate. The refractory mixture reduces the rate of coal slag penetration into the surface of the cured refractory.

17 Claims, 3 Drawing Sheets

Figure 1:
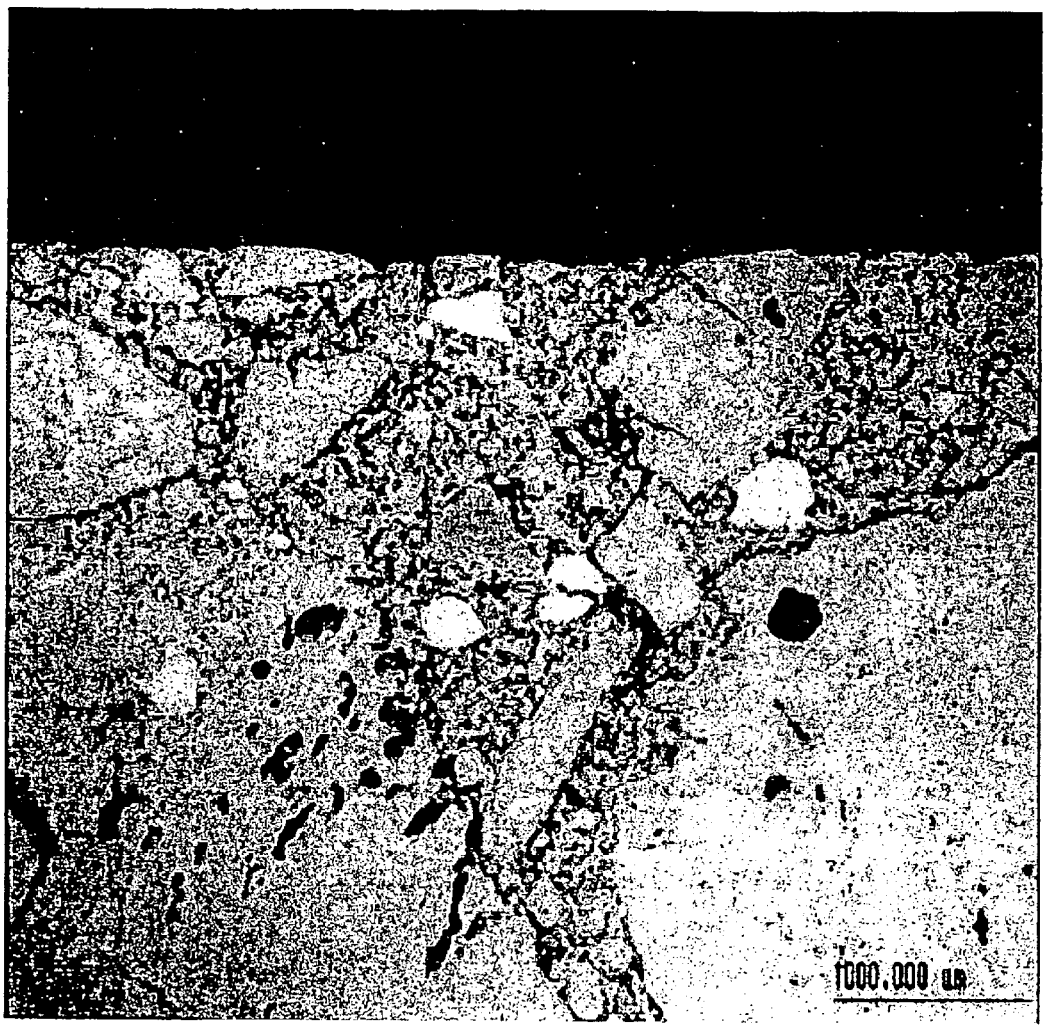

(3 of 3 Drawing Sheet(s) Filed in Color)

USE OF PHOSPHATES TO REDUCE SLAG PENETRATION IN CR2O3-BASED REFRACTORIES

STATEMENT REGARDING FEDERALLY SPONSORED RESEARCH OR DEVELOPMENT

The US Government has rights in this invention due to the employer/employee relationship between the Government and the inventors.

BACKGROUND OF THE INVENTION

1. Field of the Invention

This invention relates to high-chromium refractories and in particular high-chromium refractories for use in slagging gasifiers and coal combustion power plants. More particularly, this invention relates to high-chromium refractories having improved resistance to penetration by molten coal slag for the extension of refractory service life.

2. Description of Related Art

Integrated Gasification Combined Cycle (IGCC) power production is one of the cleanest and most efficient means of producing chemicals compounds and electricity from coal, petroleum residues, and other low- or negative-value feedstocks. Gasification of the carbon-containing feed results in the formation of synthesis gas, typically called syngas ( primarily a combination of carbon monoxide and hydrogen), and which can be used to generate electricity using a combination of gas and steam turbine technology. In addition to producing power with thermal efficiencies that are significantly higher than those obtained in conventional coal power plants, IGCC systems are also more environmentally friendly, with air emissions that exceed U.S. Clean Air Act standards.

The gasifier at the heart of the IGCC system acts as a containment vessel for the reaction of carbon-containing materials with oxygen and water to form a syngas. Gasifiers may be either dry ash or slagging systems, with the most severe environments occur in the slagging gasifiers, where operating temperatures can range from 1300° to 1600° C., depending upon the melting point and viscosity of the residual ash. In addition to high temperature, the refractory lining inside a slagging gasifier must also be able to withstand a number of other challenges, including: large and sometimes sudden variations in temperature; alternating oxidizing and reducing environments; corrosive slags and gases; erosion by residual particulate; and high pressures. Compounding these challenges is the current push within the industry for fuel flexibility, which results in slag chemistries and operating conditions that can vary widely as the feedstock for the gasifier is supplemented with alternative sources of carbon, such as petroleum coke and biomass. Several studies have indicated that because of the severity of these challenges, high-chrome bricks are the only commercial materials that are viable for this application.

Refractory liner materials high in $Cr_2O_3$ are used in slagging coal gasifiers to protect the steel shell from attack by heat, ash, and sulfur-containing compounds that are the principal by-products of the reaction. The gasifier operates at a temperature up to about 1600° C. (2900° F.) and pressures of 400 PSI or greater. The melting point of coal slag is variable, depending upon the composition of the starting feedstock, but is typically about 1200° C. (2200° F.). Slag chemistry shows that under such operational conditions, coal slags are under saturated with respect to many oxide components. As a result, coal slags will aggressively attack and dissolve virtually all refractory materials. $Cr_2O_3$-based refractories are used by the industry since they exhibit the best available slag resistance. Currently, the best chromium-based refractories provide less than two years service life in a gasifier. This is a shorter service life than necessary for economic operation of the IGCC. Every day of downtime that occurs as a result of refractory failure will cost a gasifier company millions of dollars in lost revenue. In order to provide high-chromium refractories with increased service life, it is desirable to provide a high-chromium refractory with improved resistance to coal slag penetration.

BRIEF SUMMARY OF THE INVENTION

An object of this invention is to provide a high chromium refractory that resists the penetration of coal slag into the cured refractory during use. The service life of the refractory can be extended by reducing the depth of slag penetration.

Another object of this invention is to provide a high chromium refractory that slows the penetration of coal slag into the cured refractory.

These and other objectives of the invention, which will become apparent from the following description, have been achieved by a novel refractory material for the reduction of coal slag penetration comprising an aggregate and a matrix (binder) comprising a mixture of chromium oxide and phosphates. Typically, aluminum oxides are added to the matrix to improve the mechanical properties of the matrix. In addition, the matrix may comprise a mixture of phosphorous compounds as provided by phosphates, phosphoric acid, phosphorous oxides and other inorganic oxides, such as zirconium oxide, as well as inorganic and organic binders. The organic binders are used during the "green" or pre-fired stage to improve the adhesive strength of the matrix. This invention is applicable to high-chromium refractory materials with at least sixty weight percent of chromium oxide and preferably at least seventy weight percent chromium oxide. Preferably the phosphates for use with this invention are inorganic oxides. The phosphates may be formed by the reaction of phosphoric acid and/or $P_2O_5$ with inorganic oxides. The possible inorganic oxides include, but are not limited to, $Al_2O_3$, $Cr_2O_3$, $ZrO_2$ and combinations thereof. Ideally, the matrix mixture should contain from about one weight percent to about ten weight percent phosphates. The refractory material may be made from "green" (unfired) chromium oxide or chromium oxide that has been sintered or fused. Preferably, the binder should contain less than about 0.1 weight percent of a halogen and more preferably the phosphorous compounds, such as phosphoric acid, should contain less that 0.1 weight percent of a halogen, such as fluorine, chlorine, bromine, and iodine.

The invention also relates to a process for manufacturing a refractory material for reduction of coal slag penetration comprising providing an aggregate; blending the aggregate with a matrix (binder) comprising a mixture of chromium oxide and phosphates, to form a green refractory; forming the green refractory into a shape, and curing and firing the refractory. Typically, aluminum oxides are added to the matrix to improve the mechanical properties of the matrix. The phosphates may be formed by the reaction of phosphoric acid or $P_2O_5$ with inorganic oxides and hydroxides. The matrix may also include $ZrO_2$ and $Al_2O_3$ as well as inorganic and organic binders. This invention is applicable to high-chromium refractory material with at least sixty weight percent of chromium oxide and preferably at least seventy weight percent chromium oxide. Preferably the phosphates, phosphoric acids and other phosphorous compounds for use with this invention are inorganic. The phosphates may be formed by reacting phosphorous compounds with inorganic oxides. Ideally, the mixture should contain from about one weight percent to about ten weight percent phosphorous oxides. The refractory material may be made from "green" (unfired) chromium oxide or chromium oxide that has been sintered or fused. Preferably, the binder should contain less than about 0.1 weight percent of a halogen and more preferably the phosphorous oxide should contain less that 0.1 weight percent of a halogen.

The refractory of this invention may be formed such that the entire refractory structure contains from about 1 weight percent to about 10 weight percent phosphorous oxides or the refractory may be formed such that the top five to 10 centimeters closest to the surface exposed to the coal slag contain phosphates within the specified range. The refractory material farther than from five to ten centimeters from the surface may have the same or a reduced level of phosphates or no additional phosphates.

BRIEF DESCRIPTION OF THE SEVERAL VIEWS OF DRAWINGS

Figure 2:
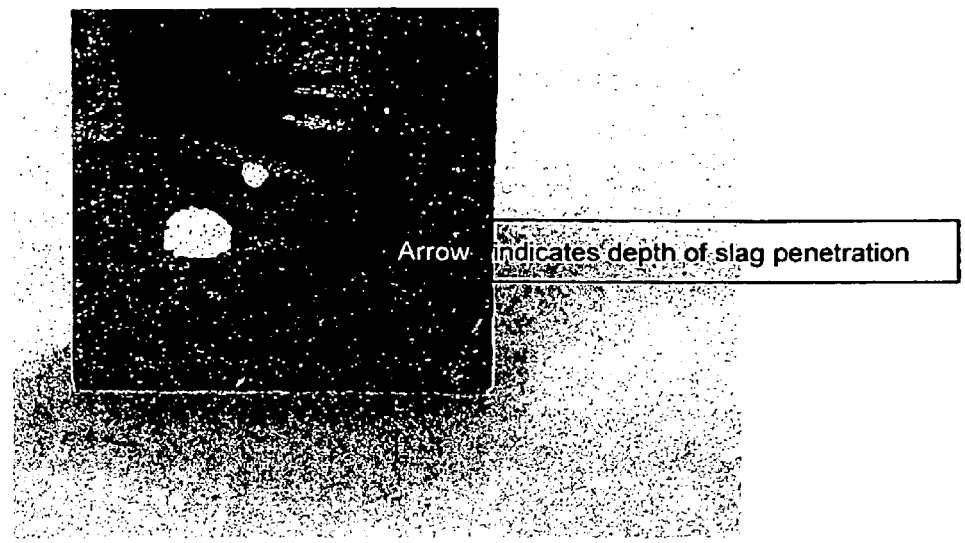
Figure 3:
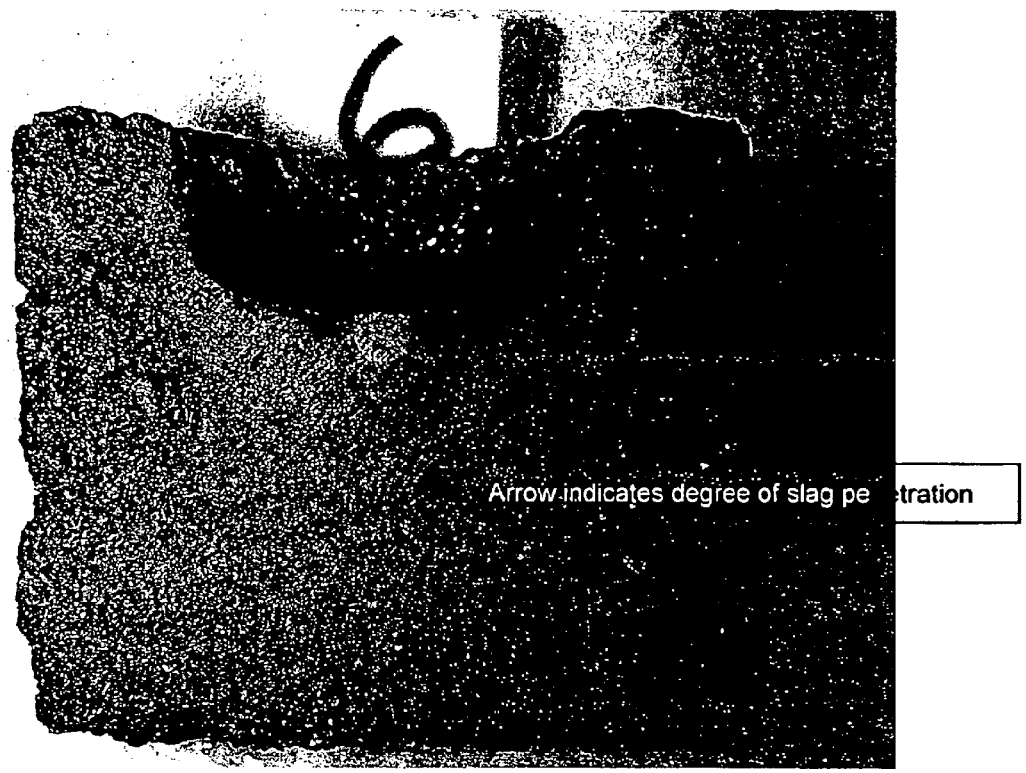

The patent or application file contains at least one drawing executed in color. Copies of this patent with color drawings will be provided by the Patent and Trademark Office upon request and payment of the necessary fee. With this description of the invention, a detailed description follows with reference being made to the accompanying figures of drawings which form part of the specification, in which like parts are designated by the same reference numbers, and of which:

FIG. 1 is a cross-sectional view, using a scanning electron microscope (SEM) that illustrates a typical sample of spent high chromium refractory, showing the details of the structure;

FIG. 2 is a cross-sectional view (photograph) that illustrates a high-chromium refractory modified as with phosphorous oxide as described by this invention exposed to a typical coal slag; and FIG. 3 is a cross-sectional view (photograph) illustrating chromium refractory having the chemical composition surface, exposed to the coal slag, as described by this invention The invention is not limited in its application to the details and construction and arrangement of parts illustrated in the accompanying drawings since the invention is capable of other embodiments that are being practiced or carried out in various ways. Also, the phraseology and terminology employed herein are for the purpose of description and not of limitation.

DETAILED DESCRIPTION OF THE INVENTION

Description of the Preferred Embodiment(s)

Examination of the chemical changes which occur in the refractory as a result of slag penetration indicates that the slag moves into the refractory primarily through the interconnected porosity and along the grain boundaries of the refractory matrix, as indicated by the scanning electron microscope (SEM) image in FIG. 1. In the color photomicrograph silicon is shown in red, while iron appears in green and calcium appears in blue. It is clear from this image, as well as from the results of laboratory exposure tests, that the slag penetrates quickly and deeply into the refractory brick, and that dissolution of the refractory is minimal and is limited primarily to the matrix regions. Except in areas immediately adjacent to the hot face of the refractory, the morphology of the aggregate grains is angular, with no evidence of dissolution or the formation of reaction layers at the aggregate surfaces. Chemical analyses of the refractory composition as a function of distance from the hot surface (Table 1) support this observation of minimal refractory dissolution. As evident in Table 1, $Cr_2O_3$ levels are slightly lower in the near hot face regions of the spent refractory, when compared to the back, or "cold" face. In addition, the data in Table 1 indicates that it is the $SiO_2$ and CaO components of the slag that penetrates most deeply into the refractory, whereas the Fe/FeO component concentrates at the slag-refractory interface, leading to the formation of a $Fe(Al, Cr)_2O_4$ spinel at the refractory surface. A difference in thermal expansion characteristics between the spinel layer and the base refractory, likely leads to easy removal of the surface spinel; however, because this layer is typically quite thin (<150 $\mu$m), it is unlikely to be the cause of large-scale material removal.

TABLE 1

Refractory Chemistry as a Function of Distance from the Hot Face

| Distance from hot face | Composition (weight percent) | | | | |
|---|---|---|---|---|---|
| | $Cr_2O_3$ | $Al_2O_3$ | $SiO_2$ | CaO | $Fe_2O_3$ |
| 1 cm | 82.4 | 10.1 | 5.8 | 0.5 | 1.2 |
| 2 cm | 86.1 | 9.6 | 3.5 | 0.6 | 0.4 |
| 3 cm | 86.7 | 9.9 | 2.6 | 0.6 | 0.1 |
| 4 cm | 88.8 | 9.4 | 1.0 | 0.5 | 0.3 |
| 5 cm | 89.6 | 9.2 | 1.0 | 0.1 | 0.1 |
| 6 cm | 90.0 | 9.2 | 0.5 | 0.1 | 0.1 |
| 7 cm | 90.6 | 8.9 | 0.4 | <0.1 | 0.1 |
| 8 cm | 90.6 | 8.7 | 0.5 | <0.1 | 0.1 |

This invention is directed to the addition of phosphorous compounds in the form of phosphates, $P_2O_5$ and phosphoric acid to a high-chromium refractory material. The refractory material is a mixture of an aggregate and fine powders. The matrix consists of chromium oxide ($Cr_2O_3$) and/or aluminum oxides, such as alumina ($Al_2O_3$) to which phosphorous compounds or other oxides, in the form of phosphates or $P_2O_5$ have been added. The phosphates can be blended with "green" (unfired) components prior to heating or to cure or sinter the components. Alternatively, the phosphates may be added to preformed refractory material that has not been fired. The phosphates may be introduced onto the surface or introduced into holes drilled into the refractory. The refractory is then heated to permit the phosphorous compounds to react with the chromium oxide and alumina to form chromium phosphates ($CrPO_4$) and aluminum phosphates ($AlPO_4$) or other phosphates. In addition, the phosphates may be added to sintered refractory by application of the phosphoric acid or $P_2O_5$ to the surface or introduction into holes drilled into the refractory. The sintered refractory is then fired to react the phosphorous compounds with the chromium oxide, alumina and other oxides in the refractory to form the compounds noted hereinabove.

EXPERIMENTAL EXAMPLES

In order to verify that phosphates capture the chemical components of the slag, in particular calcium oxide, and reduce the slag penetration, a cup exposure test was performed. The test procedures are as follows:

a) Holes one inch in diameter and one inch deep were drilled in two Aurex® 90% $Cr_2O_3$ cubes and the holes were filled with $P_2O_5$. These cubes were heated to 1600° C. for two hours in an argon gas environment. After, one cube was, sectioned to verify the existence of phosphates in the $Cr_2O_3$ refractory. EDX (Energy dispersive x-ray) analysis confirmed that phosphate compounds were formed in the chromium refractory.

b) After the $P_2O_5$ heat treatment, the hole in the second cube was filled with an industrial coal slag and the cube was heated to 1600° C. and held for one hour in an argon gas atmosphere. After cool-down, the cube was sectioned for optical and SEM analysis. SEM analysis confirmed that slag penetration into the chromium refractory was limited to within 1 mm of the refractory-slag interface.

c) A chromium-based refractory matrix with a small amount (<5 weight percent) of a phosphate-based material was treated as follows. A cup or hole was drilled into the phosphate-modified, high-chromium refractory brick and filled with a coal ash slag with the composition (weight percent) 51% $SiO_2$, 21% $Al_2O_3$, 20% $Fe_2O_3$, 6% CaO and 2% MgO. The slag-filled cup was then placed in a furnace and heated to 1600° C. for 24 hours in an argon environment. Following the exposure test, the refractory was cross-sectioned and examined for evidence of slag penetration and attack. As can be seen in FIG. 2, the level of slag penetration in the phosphate-modified refractory is limited to within 1 mm of the refractory-slag interface.

d) A cup-shaped refractory was pressed from a mixture of $Cr_2O_3$ aggregate (164.8 gm) (−4+10 mesh), $Cr_2O_3$ small aggregates (84 gm) (−10+28 mesh), $Cr_2O_3$ (39.2 gm) and $Al_2O_3$ (6.34 gm) powders and phosphoric acid (12.8 cc). The packing density of this cup was about 85%. The cup was then fired up to a temperature of 1600° C. for one hour in air. To perform the cup test, the cup was filled with industrial coal slag. The filled cup with the coal slag was fired up to 1600° C. for one hour in argon gas. Results from the cup test show that the combination of aluminum and chromium phosphates in the matrix reduced the slag penetration to within less than 1 mm from the refractory-slag interface.

e) A cup-shaped refractory was pressed from a mixture of $Cr_2O_3$ aggregate (164.8 gm), $Cr_2O_3$ small aggregates (84 gm), $Cr_2O_3$ (60.57 gm) powder and phosphoric acid (12.8 cc). The packing density of this cup was about 85%. The cup was then fired up to a temperature of 1600° C. for one hour in air. To perform the cup test, the cup was filled with industrial coal slag. The filled cup with the coal slag was fired up to 1600° C. for one hour in argon gas. Results from the cup test show that chromium phosphates in the matrix reduced the slag penetration to within less than 1 mm from the refractory-slag interface, as shown in FIG. 3.

Thus, in accordance with the invention, there has been provided a high chromium refractory that resists the penetration of coal slag into the cured refractory during use. There has also been provided a high chromium refractory that slows the penetration of coal slag into the cured and fired refractory.

With this description of the invention in detail, those skilled in the art will appreciate that modification may be made to the invention without departing from the spirit thereof. Therefore, it is not intended that the scope of the invention be limited to the specific embodiments that have been illustrated and described. Rather, it is intended that the scope of the invention be determined by the scope of the appended claims.

We claim:

1. A refractory material for the reduction of coal slag penetration comprising an aggregate and a matrix comprising a mixture of chromium oxide, an inorganic oxide and a phosphate, wherein the matrix contains at least about sixty weight percent of chromium oxide.

2. A refractory material of claim 1 wherein the matrix further comprises aluminum oxide.

3. A refractory material of claim 1 wherein the matrix further comprises $ZrO_2$.

4. The refractory material of claim 1 wherein the refractory contains at least seventy weight percent chromium oxide.

5. The refractory material of claim 1 wherein the phosphate is an inorganic phosphate.

6. The refractory material of claim 1 wherein the phosphate is formed by the reaction of chromium oxide and the inorganic oxides with a phosphorus source, wherein the phosphorous source is selected from the group of phosphoric acid and $P_2O_5$.

7. The refractory material of claim 1 wherein the matrix contains from about one weight percent to about ten weight percent phosphates.

8. The refractory material of claim 1 wherein the chromium oxide is sintered.

9. The refractory material of claim 1 wherein the matrix contains less than about 0.1 weight percent of a halogen.

10. The refractory material of claim 1 wherein the phosphate contains less that 0.1 weight percent of a halogen.

11. A process for manufacturing a refractory material for reduction of coal slag penetration comprising providing an aggregate;

blending the aggregate with a matrix comprising a mixture of chromium oxide, inorganic oxides and a phosphate, to form a green refractory, wherein the matrix contains at least sixty weight percent of chromium oxide;

forming the green refractory into a shape; and curing and firing the shape of green refractory to form an aggregate and a binder of chromium oxide and alumina phosphate.

12. The process for manufacturing refractory material of claim 11 wherein the phosphate is inorganic.

13. The process for manufacturing refractory material of claim 11 wherein the phosphate is formed by the reaction of chromium oxide and the inorganic oxide with a phosphorus souse, wherein the phosphorous source is selected from the group of phosphoric acid and $P_2O_5$.

14. The process for manufacturing refractory material of claim 11 wherein the matrix contains from about one weight percent to about ten weight percent phosphate.

15. The process for manufacturing refractory material of claim 11 wherein the chromium oxide is sintered.

16. The process for manufacturing refractory material of claim 11 wherein the matrix contain less than about 0.1 weight percent of a halogen.

17. The process for manufacturing refractory material of claim 11 wherein the phosphate contains less that 0.1 weight percent of a halogen.

* * * * *